Sept. 15, 1964     H. W. ROESSLER, JR     3,148,922
PLUGGING DEVICE
Filed Jan. 12, 1960     4 Sheets-Sheet 1
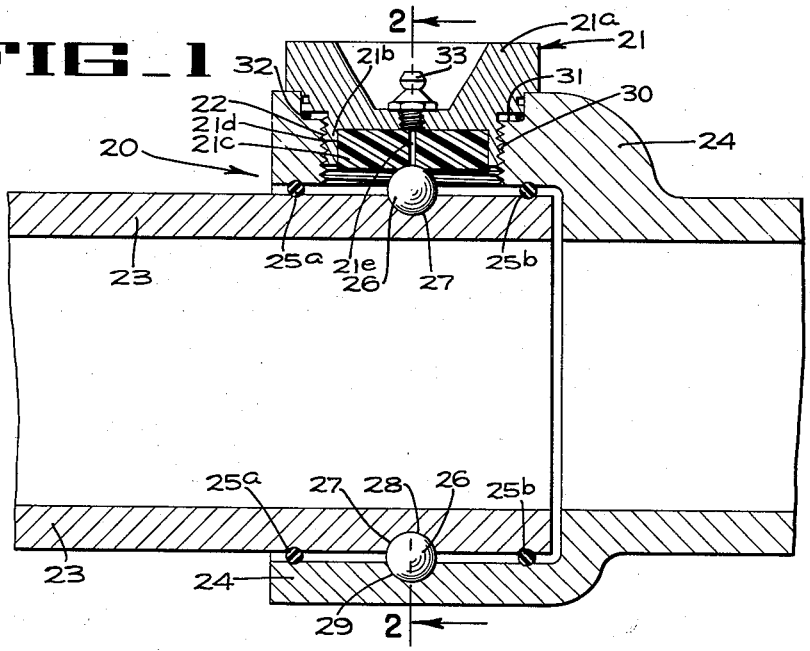
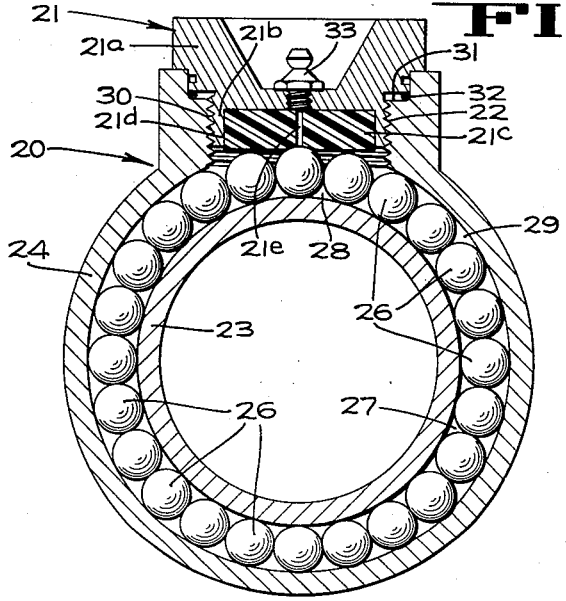
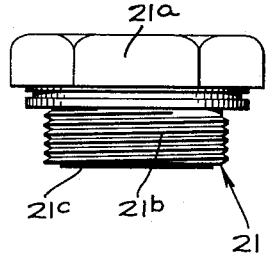
INVENTOR
HENRY W. ROESSLER, JR.
ATTORNEY Sept. 15, 1964  H. W. ROESSLER, JR  3,148,922
PLUGGING DEVICE
Filed Jan. 12, 1960
4 Sheets-Sheet 2
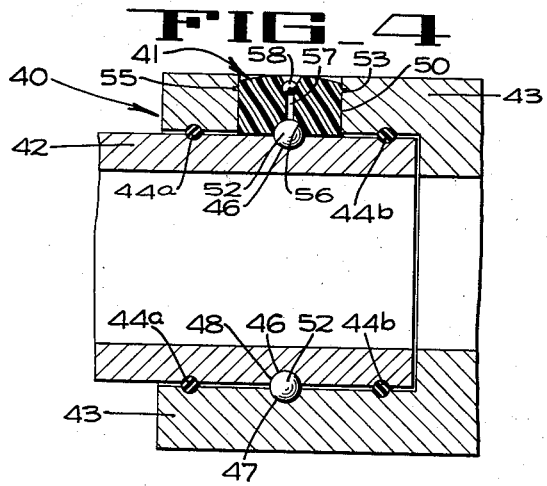
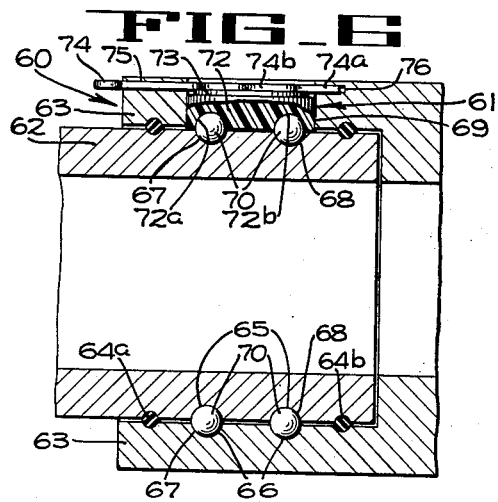
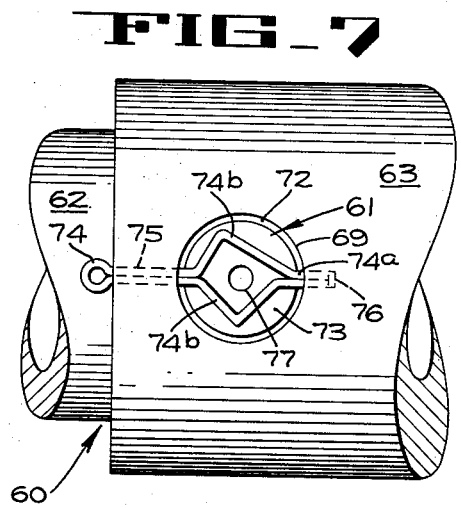
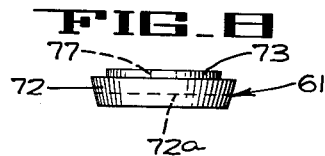
INVENTOR
HENRY W. ROESSLER, JR.
BY
ATTORNEY Sept. 15, 1964     H. W. ROESSLER, JR     3,148,922
PLUGGING DEVICE
Filed Jan. 12, 1960     4 Sheets-Sheet 3
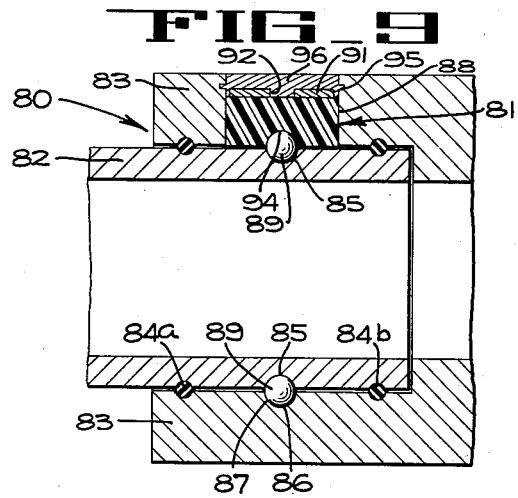
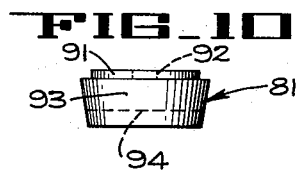
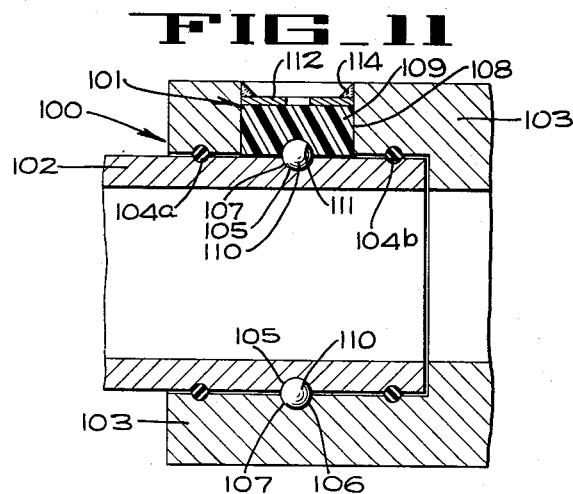
INVENTOR
HENRY W. ROESSLER, JR.
BY *Hans G. Hoffmeister*
ATTORNEY Sept. 15, 1964    H. W. ROESSLER, JR    3,148,922
PLUGGING DEVICE
Filed Jan. 12, 1960    4 Sheets-Sheet 4
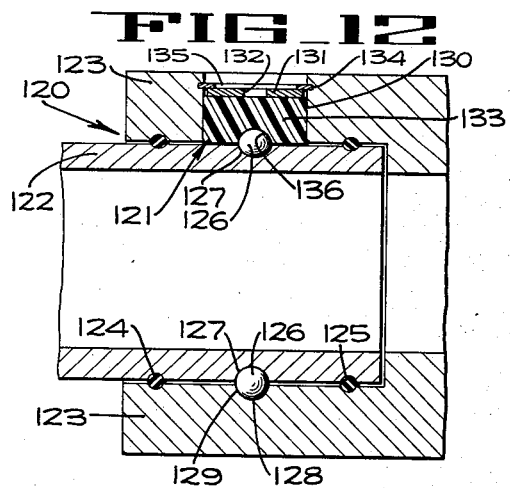
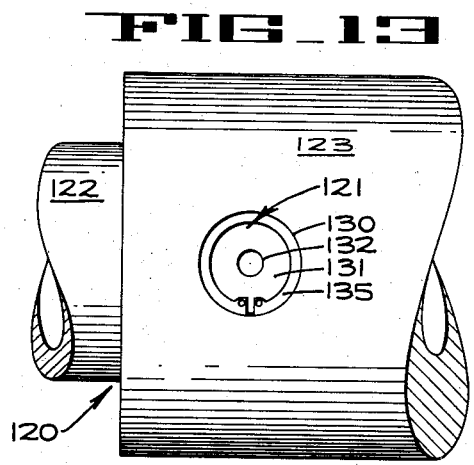
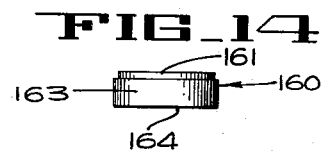
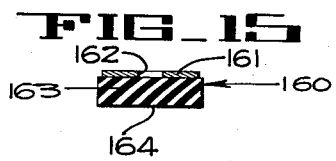
INVENTOR
HENRY W. ROESSLER, JR.
BY *Hans G. Hoffmeister*
ATTORNEY United States Patent Office 3,148,922
Patented Sept. 15, 1964

1

3,148,922
PLUGGING DEVICE
Henry W. Roessler, Jr., Pomona, Calif., assignor, by mesne assignments, to FMC Corporation, San Jose, Calif., a corporation of Delaware
Filed Jan. 12, 1960, Ser. No. 1,992
15 Claims. (Cl. 308—198)

This invention pertains to ball bearings and more particularly relates to a device for plugging an access opening or passage through which ball bearings are introduced into and removed from the ball race of a ball bearing swivel joint.

Ball bearings have long been used to resist relative axial movement while permitting relative rotary movement between an inner and an outer cylindrical member. Swivel joints for fluid lines, for example, are commonly provided with one or more ball races containing balls which permit the free rotation of one cylindrical member with respect to the other. In some types of such swivel joints, access openings are provided for filling the ball races with balls. These access openings must be plugged to retain the balls in operative relation within the ball races.

An object of the invention is to inexpensively close a ball race access opening.

Another object of the invention is to provide an improved plugging device for a ball race access opening.

Another object of the invention is to provide a plug for a ball race access opening which can be installed and removed quickly, easily, and with the most simple of tools.

Another object is to provide a ball race access opening plug which resiliently engages and guides ball bearings within a ball race.

Another object is to provide a ball bearing swivel joint wherein the improved ball retaining plug of the invention is employed.

Another object is to provide improved means for retaining a ball retaining plug within the opening through which access may be had to the race of a ball bearing.

Another object of the present invention is to provide a readily yieldable plug for sealing the access passage leading to a ball bearing raceway between two relatively rotatable, interconnected cylindrical members, whereby a plug fit is provided which allows the ball bearings to roll within the raceway without binding or hopping in the vicinity of the plug in spite of slight misalignment of the various components due to their manufacturing tolerances.

These and other objects and advantages of the invention will be apparent from the following description taken in conjunction with the accompanying drawings in which:

FIGURE 1 is an axial section of a swivel joint incorporating the ball race access opening plugging device of the invention.

FIGURE 2 is a section along line 2—2 of FIGURE 1.

FIGURE 3 is an elevation of the plugging device of FIGS. 1 and 2 apart from the swivel joint.

FIGURE 4 is a fragmentary axial section through a swivel joint incorporating a second embodiment of the access opening plugging device of the invention.

FIGURE 5 is a side elevation of the plugging device illustrated in FIG. 4.

FIGURE 6 is a view similar to FIG. 4 illustrating a third embodiment of the plugging device of the invention.

FIGURE 7 is a top plan of the swivel joint fragment and the plugging device illustrated in FIG. 6.

FIGURE 8 is a side elevation of the plugging device illustrated in FIG. 6 and 7.

2

FIGURE 9 is another view similar to FIG. 4 illustrating a fourth embodiment of the plugging device of the present invention.

FIGURE 10 is a side elevation of the plugging device illutsrated in FIG. 9.

FIGURE 11 is another view similar to FIG. 4, illustrating a fifth embodiment of the plugging device of the invention.

FIGURE 12 is another view similar to FIG. 4, illustrating a sixth embodiment of the plugging device of the invention.

FIGURE 13 is a top plan of the swivel joint fragment and the plugging device illustrated in FIG. 12.

FIGURES 14 and 15 are a side elevation and a vertical section, respectively, of a seventh embodiment of the plugging device of the invention.

FIGS. 1 and 2 illustrate a swivel joint 20 utilizing a plugging device 21 of the present invention for closing its ball race access passage or opening 22. The swivel joint 20 comprises relatively rotatable inner and outer metallic cylindrical members 23 and 24, respectively, which members are sealed against fluid leakage therefrom by O-rings 25a and 25b in a well known manner. Axial movement between the two cylindrical members 23 and 24 is prevented by a plurality of relatively hard and rigid balls 26 which are arranged in a ball race 27 defined by a raceway 28 in the outer peripheral surface of the inner cylindrical member 23 and an aligned raceway 29 in the inner peripheral surface of the outer cylindrical member 24. The access passage 22 extends radially through one wall of the outer cylindrical member 24, is threaded as at 30, and includes an annular shoulder 31.

The plugging device 21 includes a hexagonal head 21a (FIG. 3) and a threaded shank 21b, which is screwed into the threaded access opening 22. An O-ring 32 is compressed between the head 21a and the access opening shoulder 31 to seal the plugging device in the access opening. A disc 21c of a readily yieldable and resilient material, such as rubber, rubber-like material, or a readily yieldable plastic material such as polytetrafluoroethylene, commonly known as "Teflon," is inserted in an axial bore 21d in the shank 21b of plugging device 21. The disc 21c is somewhat longer in axial extent than the depth of the bore 21b, and, when the plug 21 is properly seated within the access opening 22, serves as a continuation of the raceway 29, bridging across the inner end of the access opening and thereby providing for rolling of the balls 26 past the same. The parts are so proportioned that the balls 26 bear against the disc 21c with sufficient pressure to deform the disc slightly, pressing a groove (not shown) into its inner face after the plug has been in use for a time, which groove may or may not be permanent or semi-permanent, depending upon the degree of resilience of the particular yieldable material of which the disc 21c is formed. Since one of the characteristics of Teflon is that it posessses but little inherent resilience relative to the resilience possessed by rubber or a rubber-like material, this material is especially adapted for use as the material form which to fabricate the disc 21c. Since the hardness of Teflon is of the nature of Durometer reading 55 (Shore Scale A), and since the modulus of elasticity of this substance is in the order of only 58,000 p.s.i., it can be appreciated that the material will readily be deformed when in contact with the metallic balls 26, although not quite as readily as would an elastomeric material such as rubber. The inherent resilience of a polyfluoroethylene plug, while causing some pressure to be exerted upon the balls in resilient engagement therewith, will not be such as to substantially interfere with the free passage of the balls around the raceway.

Regardless of the degree of resilience of the material of which the disc 21c is formed, its yieldable characteristic enables it to compensate for any inaccuracies in machining the various parts of the plugging device that might influence the depth to which the disc 21c projects into the path of the balls 26 when the plugging device is screwed into the access opening.

This plugging device can be mass produced using manufacturing methods that are rapid and inexpensive and have a normal range of dimensional tolerance. No dimension on the plug need be closely adhered to because the deformable or yieldable insert 21c accommodates all reasonable variations thereof assuming, of course, that the plug is inserted into the access opening 22 far enough so as to resiliently engage the balls 26 which are aligned with the access opening.

A lubrication fitting 33 is threaded into the plugging device 21 and is aligned with a small central hole 21e in the disc 21c for permitting lubricant to be forced through the fitting 33 and the hole 21e into the ball race 27 to lubricate the balls 26.

A swivel joint 40 employing another embodiment 41 of the plugging device of the invention is shown in FIG. 4. It comprises an inner metallic cylindrical member 42 and an outer metallic cylindrical member 43 sealed against fluid leakage by O-rings 44a and 44b in a known manner. A raceway 46 formed in the outer peripheral surface of the inner cylindrical member 42 and a raceway 47 formed in the inner peripheral surface of the outer cylindrical member 43 are aligned to define a ball race 48. An access opening 50 (FIG. 4) extends radially through one side wall of the outer cylindrical member 43 and hard and rigid balls 52 are inserted through this opening into the ball race 48. The access opening 50 is a cylindrical bore having an undercut or annular groove 53 in its side wall near the outer end thereof.

The access opening 50 is plugged by the plugging device 41 (FIGS. 4 and 5) which is of cylindrical form and is made of a deformable or yieldable material. An annular bead 55 projecting from the circumferential wall of the plugging device 41 is adapted to seat within the annular groove 53 in the access opening side wall as illustrated in FIG. 4. The plugging device 41 has a semi-cylindrical transverse groove 56 across the inner end thereof; and when the plug 41 is inserted into the access opening 52, the groove 56 should be aligned with the balls in the ball race 48. While relative rotation occurs between the two swivel joint members 42 and 43, the balls 52 pass successively across the inner end of the access opening 50. They are guided thereacross by the groove 56, the semi-circular cross-section of which corresponds in radius to each of the balls 52, so that the walls of the groove 56 are, in effect, a continuation of the outer raceway 47. Since the groove 56 is straight across the flat face of the plug, and since the balls 52 must take a somewhat arcuate path across the access opening because of the arcuate shape of the inner raceway 46, it is obvious that the balls will deform the inner or central portion of the groove 56 somewhat if the groove is to constitute at least a partial continuation of the outer raceway 47. The readily yieldable nature of the plug material permits this deformation in the central portion of the plug and places those balls which are received beneath the plug under compression to prevent "hopping" of the balls at the edges of the plug. It will be undertsood, therefore, that the plugging device 41 maintains contact between the balls 52 that are in alignment with the access opening 50 and the raceway 46 in the inner cylindrical member.

An axial bore 57 in the plugging device 41 is adapted to receive a small metal ball 58, which has a larger diameter than the bore 57. Upon being inserted, the metal ball 58 expands the material of the plugging device 41 and thus forces the same to tightly engage and seal against the side wall of the access opening 50 and retain the plug therein by friction. The bead 55 is provided as an extra assurance that the plugging device will not shift axially in the access opening 50.

A swivel joint 60 utilizing a plugging device 61 (FIGS. 6–8) that constitutes a third embodiment of the invention comprises an inner metallic cylindrical member 62 and an outer metallic cylindrical member 63. The inner and outer cylindrical members rotate freely with respect to each other, and are sealed against fluid leakage by O-rings 64a and 64b, in known manner. The inner cylindrical member 62 contains two raceways 65 in the outer peripheral surface thereof and the outer cylindrical member 63 contains two raceways 66 in the inner peripheral surface thereof. Each of the raceways 65 is aligned with one of the raceways 66 to define two ball races 67 and 68.

Access to the ball races 67 and 68 is had through a cylindrical access opening 69 extending radially through one side wall of the outer cylindrical member 63. A sufficient number of hard and rigid balls 70 are inserted through the access opening to fill both of the ball races 67 and 68.

The access opening is plugged by the plugging device 61 (FIGS. 6, 7 and 8), which comprises a frusto-conical member 72 of yieldable material such as rubber or Teflon and having the larger diameter end thereof bonded to a backing disc 73 of rigid material, e.g., metal or unplasticized polyvinyl chloride. While the smaller diameter of the frusto-conical member 72 is substantially the same diameter as the diameter of the cylindrical access opening 69, the larger outside diameter of the frusto-conical member 72 is larger than the diameter of the access opening 69. Therefore, when the plug is inserted in the access opening the material of the member 72 is compressed, causing the plug to seal against the side walls of the access opening. The face of the plugging device 61 opposite the disc 73 contains two parallel transverse semi-cylindrical grooves 72a and 72b therein, within which the balls 70 in the ball races 67 and 68, respectively, roll when relative motion occurs between the joint members. The plug thus provides a readily yieldable and slightly resilient backing surface which retains the balls in the raceway 65 in the inner cylindrical member 62, as the members of the swivel joint rotate with respect to each other, by deforming and resiliently engaging the balls which come into alignment with the plug.

The plugging device 61 is held in the access opening 69 by a cotter pin 74 (FIGS. 6 and 7). The cotter pin 74 is inserted in a hole 75 drilled into the end of the outer swivel joint member 63 parallel to and just within the outer circumferential surface thereof, in position to enter the access opening 69 adjacent the outer end thereof. After drilling the hole 75, the drill (not shown) is fed diametrically across the access opening 69 and on into the opposite side wall thereof to form a blind hole 76 (FIGS. 6 and 7) aligned with the hole 75. The cotter pin 74 is inserted into the hole 75 far enough to extend across the access opening and for its end 74a to enter and seat within the blind hole 76, after which the middle regions 74b of the legs of the cotter pin 74 are bent apart and remain in contact with the upper surface of the metal disc 73 of the plugging device 61. The cotter pin 74 thus retains the plugging device 61 at a particular depth in the access opening 69.

The plugging device 61 is removed from the access opening 69 by first removing the cotter pin 74 and then inserting a pointed tool (not shown) into a central hole 77 in the metal disc 73. The tool is then used to flip the metal disc 73 and attached member 72 of the plugging device out of the access opening 69. It will be apparent that more than one cotter pin could be used across the top of the flat metal disc 73 to retain the plugging device in correct position within the access opening.

A swivel joint 80 (FIG. 9) employing a plugging device 81 (FIGS. 9 and 10) that constitutes a fourth embodiment of the invention comprises an inner metallic cylindrical member 82 and an outer metallic cylindrical member 83. The inner and outer cylindrical members rotate freely with respect to each other, and are sealed against fluid leakage by O-rings 84a and 84b in known manner. A raceway 85 and an aligned raceway 86 in the inner and outer cylindrical members, respectively, define a ball race 87. An access opening 88 through a side wall of the outer cylindrical member 83 communicates with the ball race 87 and hard and rigid balls 89 are inserted through the access opening until the ball race 87 is full.

The plugging device 81 (FIGS. 9 and 10) for the access opening 88 includes a flat metal disc 91 having a central opening 92 therein, and a frusto-conical member 93 of a readily yieldable plastic, rubber, or rubber-like material. The frusto-conical member 93 includes a diametric groove 94 in the inner face thereof, which groove is semi-cylindrical in shape. Balls 89 in alignment with the opening 88 resiliently engage the plug 81 within the groove 94 thereof to thereby deform the groove slightly at its central portion as with the previously described embodiments, so that the device 81 retains the balls in engagement with the raceway 85 in the inner cylindrical member 82 and prevents any movement laterally of the ball race 87 or "hopping" in the vicinity of the plug. The larger diameter end of the member 93 of the plugging device 81 is deformed or compressed as it is inserted into the cylindrical access opening 88 and the plugging device is thus sealed against the side walls of the access opening.

The access opening 88 includes an annular undercut or groove 95 adjacent the upper end thereof. Molten metal 96 such as babbit or lead is poured into the upper end of the access opening 88 and flows into the annular groove 95 in sufficient quantity to substantially fill the space above the metal disc 91 of the plugging device. When the poured metal 96 cools sufficiently to solidify, it locks the plugging device in place within the access opening 88.

A swivel joint 100 employing a plugging device 101 (FIG. 11) that comprises a fifth embodiment of the invention includes an inner metallic cylindrical member 102 and an outer metallic cylindrical member 103. The members 102 and 103 freely rotate with respect to each other and are sealed against fluid leakage by O-rings 104a and 104b in known manner. Anular raceways 105 and 106 cut in the inner and the outer cylindrical members 102 and 103, respectively, are aligned to define a ball race 107.

The ball race 107 communicates with an access opening 108 extending radially through a side wall of the outer cylindrical member 103. Balls 110, of hard and rigid material, are inserted into the ball race 107 through the access opening 108 to provide a bearing for the relative turning of the inner and outer cylindrical members.

The plugging device 101 is similar to the plugging device 81 illustrated in FIG. 10. It is provided with a semi-cylindrical groove 111 in the inner face of the plastic or rubber member 109 thereof, along which the balls 110 in the ball race 107 roll. Thus, the plugging device retains the balls 110 against the raceway 105 as previously described.

The plugging device 101 includes a metal disc 112 bonded to the yieldable member 109. The outside diameter of the metal disc 112 is substantially the same as the diameter of the access opening 108. The plugging device 101 is retained in the access opening by welding, brazing, or soldering a fillet 114 between the outer peripheral edge of the metal disc 112 and the walls of the access opening 108 in the outer cylindrical member 103.

A swivel joint 120 (FIGS. 12 and 13) having a plugging device 121 that constitutes a sixth embodiment of the invention includes an inner metallic cylindrical member 122 and an outer metallic cylindrical member 123, which members are sealed against fluid leakage by O-rings 124 and 125 in known manner. The inner and outer cylindrical members are locked against relative axial movement, but are permitted to freely rotate with respect to each other by a plurality of relatively hard and rigid ball bearings 126 in an annular raceway 127 in the inner cylindrical member and a raceway 128 in the outer cylindrical member. The annular raceways 127 and 128 are aligned and together define a ball race 129. Access to the ball race 129 is gained through a radial opening or access passage 130 through a side wall of the outer cylindrical member 123.

The access opening 130 is plugged by the plugging device 121, which includes a flat metal disc 131 having a hole 132 in the center thereof, and a frusto-conical portion 133 of a readily yieldable plastic, rubber, or rubber-like material. The plugging device 121 has a semi-cylindrical diametric groove 136 formed in the inner end thereof, and when the device is inserted into the opening 130 the balls in alignment with the opening 130 resiliently engage the device 121 within the groove 136 so that they are retained in place in the raceway 127. As is the case with the previously described embodiments, the plug should be inserted into the access opening far enough so that the balls will not be subject to motion laterally of the ball race 129 in the vicinity of the plug, particularly at the two end portions of the groove 136. Since the groove is formed straight across the flat face of the plug, it will be deformed somewhat in the central portion thereof and the readily yieldable material of the plug will exert a compressive force on at least that ball that is in line with the axis of the plug. The diameter of the frusto-conical portion 133 at its larger end is larger than the diameter of the access opening. Therefore, the portion 133 is deformed as it is inserted into the access opening 130, and it is thus sealed against the walls of the access opening 130. It will be apparent that a small hole could be provided centrally through the frusto-conical portion 133 for admitting lubricant to the ball race 129.

A shallow annular undercut or groove 134 is cut in the access opening 130 adjacent the upper end thereof, and the groove receives a snap-ring 135 (FIGS. 12 and 13) for retaining the plugging device 121 in the access opening. The snap-ring expands into the annular groove 134 and retains the plugging device 121 against the balls 126 in the ball race 129. The plugging device can be removed by first removing the snap-ring and inserting a suitable tool (not shown) in the central hole 132 in the metal disc 131 and withdrawing the plugging device 121 with the tool.

A plugging device 160 that constitutes a seventh embodiment of the invention is illustrated in FIGURES 14 and 15. The plugging device 160 comprises a flat metal disc 161 having a central hole 162 therein for facilitating engagement by a sharp removal tool, and includes a cylindrical portion 163 of resilient material such as rubber, bonded to the disc 161. The lower face 164 of the portion 163 is flat or straight rather than grooved, as is the case of several of the previously described embodiments of the plugging device of the invention. The resilient portion 163 projects into the ball race to a substantial extent and the balls in traversing the raceway will be impressed in the flat surface 164. The portion 163 is deformed but it is resilient and it therefore tends to restore itself to the original flat condition following the passage of each ball.

It will be apparent from the foregoing description that the present invention is capable of being embodied in several different forms of plugging device. Further modifications and variations of the described devices that may occur to persons skilled in this art are included within the scope of the invention as determined by the claims to follow.

The invention having been described, that which is claimed as new and desired to be protected by Letters Patent is:

1. A device for closing a cylindrical passage intersecting an enclosed ball race, comprising a plug of a readily yieldable and resilient material having across one end face of the plug semi-cylindrical diametric groove, and means for securing the plug within said passage with the groove constituting at least a partial continuation of said ball race.

2. A swivel joint comprising an inner rigid cylindrical member, an outer rigid cylindrical member in concentric relationship therewith, said members having registering annular ball raceways therein cooperating to define a ball race between said cylindrical members, one of said cylindrical members having a cylindrical access passage leading radially through a wall thereof into the ball race, a plurality of relatively hard and rigid balls within said ball race for rotatably interconnecting said cylindrical members, and means for plugging the access passage to retain the balls in the ball race comprising a plug received within said passage and being of a readily yieldable material, and means securing the plug within the access passage with one face of said plug projecting into said ball race in position to successively resiliently engage the balls in the ball race.

3. A swivel joint comprising a first and a second metallic cylindrical member cooperating to define a ball race therebetween, one of said members having therein a cylindrical passage leading into said ball race, said passage having a recess in the side wall thereof, a plurality of relatively hard and rigid balls within the ball race, a plug of a readily yieldable material relative to the material of said balls within said access passage with one portion thereof contacting balls in the ball race and forming at least a partial continuation of said ball race within said passage, and means engaged within said recess in said side wall for retaining the plug in said access passage.

4. A swivel joint according to claim 3 in which the plug retaining means engaged within the side wall recess is a resilient snap-fit member.

5. A swivel joint according to claim 3 in which the plug retaining means engaged within the side wall recess is a cotter pin.

6. A swivel joint according to claim 3 in which the plug retaining means engaged within the side wall recess is solidified metal.

7. In a joint comprising interconnected coaxial cylindrical members having mating circumferential grooves to define an enclosed ball race between said members, a plurality of balls within said ball race to connect said cylindrical members for relative rotation and to prevent relative axial movement thereof, and an access passage leading radially through the wall of one of said members and into said ball race, the improvement comprising a plug inserted into said passage and having one end of a readily yieldable material with respect to the material of said balls and said cylindrical members, said end being in resilient engagement with at least one of said balls whereby said plug constitutes at least a partial continuation of said ball race within said access passage and prevents said balls from moving laterally of said ball race at said access passage.

8. A device according to claim 7 wherein the plug is provided with a recess and a ball of larger diameter than that of the recess is received within the recess to expand the plug in the region of the ball into tight sealing engagement with the wall of the access passage.

9. A device according to claim 8 wherein said plug is provided with a diametric groove across said one end thereof for receiving the balls in the ball race.

10. A device according to claim 8 wherein said plug is provided with an annular rib on the outer periphery thereof and said access passage is provided with an annular groove in the wall thereof for the reception of said rib.

11. In a joint comprising interconnected coaxial cylindrical metallic members having mating circumferential grooves to define an enclosed ball race therebetween, a plurality of hard and rigid balls within said ball race to connect the members for relative rotary movement and prevent their relative axial movement, and an access passage leading radially through the wall of one of said members to intersect said ball race, the improvement comprising a plug inserted into said passage and having one end of a readily yieldable and slightly resilient, soft plastic material, said end being in resilient engagement with at least one of said balls whereby said plug constitutes at least a partial continuation of said ball race within said access passage and prevents said balls from moving laterally of said ball race at said access passage, and means at the other end of said plug for securing said plug within said access passage.

12. In a relatively rotatable joint comprising interconnected inner and outer cylindrical members, said members being of a relatively rigid material and having mating circumferential grooves therein defining an enclosed ball race between said members, a plurality of relatively rigid balls within said ball race to interconnect said members for relative rotary movement and prevent relative axial movement therebetween, and an access passage leading radially through the wall of the outer member to intersect said ball race, the improvement comprising a plug inserted into said passage and having one end of a readily yieldable material with respect to the rigid material of said balls and said members, said end being in resilient engagement with at least one of said balls whereby said plug constitutes at least a partial continuation of said raceway within said access passage, said plug being deformed so as to place said balls under compression and prevent movement of said balls laterally of said ball race, and means adjacent the other end of said plug for securing the plug within said access passage.

13. In a joint comprising inner and outer cylindrical members in coaxial alignment interconnected for relative rotation, said members being of relatively rigid material and having mating circumferential grooves therein defining an enclosed ball race between said members, a plurality of relatively rigid balls within said ball race to interconnect said cylindrical members for relative rotary movement and prevent relative axial movement between the members, and an access passage leading radially through the wall of said outer member to intersect said ball race, the improvement comprising a plug for closing said access passage, said plug being of a readily yieldable material with respect to the rigid material of said balls and said members, said plug being received within said passage in engagement with the wall of said passage and having an end portion projecting into said ball race into resilient engagement with at least one of said balls so as to constitute at least a partial continuation of said raceway within said access passage, and a backing disc of a relatively rigid material bonded to the other end portion of the plug and having an indention therein for permitting the easy removal of said plug from said access passage.

14. In a joint comprising inner and outer cylindrical members in coaxial alignment interconnected for relative rotation, said members being of relatively rigid material and having mating circumferential grooves therein defining an enclosed ball race between said members, a plurality of relatively rigid balls within said ball race to interconnect said cylindrical members for relative rotary movement and prevent relative axial movement therebetween, and a cylindrical access passage leading radially through the wall of said outer member to intersect said ball race, the improvement comprising a frusto-conical plug for closing said access passage, said plug being of a readily yieldable material with respect to the rigid material of said balls and said members, the smaller end of the plug substantially corresponding in diameter to the diameter of said access passage and the larger end of the plug being materially larger than the diameter of the access passage, the plug being received within said passage in deformed condition so as to tightly seal against the walls of the passage with the smaller end portion projecting into said ball race into resilient engagement with at least one of said balls so as to constitute at least a partial continuation of said raceway within said access passage.

15. In a joint comprising inner and outer cylindrical members in coaxial alignment interconnected for relative rotation, said members being of relatively rigid material and having mating circumferential grooves therein defining an enclosed ball race between said members, a plurality of relatively rigid balls within said ball race to interconnect said cylindrical members for relative rotary movement and prevent their relative axial movement, and a cylindrical access passage leading radially through the wall of said outer member to intersect said ball race, the improvement comprising a frusto-conical plug for closing said access passage, said plug being of a readily yieldable material with respect to the rigid material of said balls and said members, the smaller end of the plug substantially corresponding in diameter to the diameter of said access passage and the larger end of the plug being materially larger than the access passage, the plug being received within said passage in deformed condition so as to tightly seal against the walls of the passage with the smaller end portion projecting into said ball race, the face of said smaller end portion having a diametric groove therein generally aligned with said ball race, said plug resiliently engaging at least one of said balls within said diametric groove and constituting at least a partial continuation of said ball race within said access passage, said plug being deformed to the extent necessary for the plug to engage the balls in alignment with said access passage and prevent their movement laterally of said ball race at the passage.

References Cited in the file of this patent

UNITED STATES PATENTS

| | | |
|---|---|---|
| 549,702 | Canfield | Nov. 12, 1895 |
| 1,174,541 | Bernheim | Mar. 7, 1916 |
| 2,194,940 | Hiertz | Mar. 26, 1940 |
| 2,274,779 | Davis | Mar. 3, 1942 |
| 2,396,123 | Phillips | Mar. 5, 1946 |
| 2,624,644 | Bryant | Jan. 6, 1953 |
| 2,759,243 | Smith | Aug. 21, 1956 |
| 2,790,632 | Mellette | Apr. 30, 1957 |
| 2,805,107 | Van De Warker et al. | Sept. 3, 1957 |
| 2,847,593 | Selbach et al. | Aug. 12, 1958 |

FOREIGN PATENTS

| | | |
|---|---|---|
| 677,237 | Great Britain | Aug. 13, 1952 |
| 729,351 | Great Britain | May 4, 1955 |